(12) United States Patent
Nakamura

(10) Patent No.: US 11,371,580 B2
(45) Date of Patent: Jun. 28, 2022

(54) CENTRIFUGAL PENDULUM DAMPER

(71) Applicant: Toyota Jidosha Kabushiki Kaisha, Toyota (JP)

(72) Inventor: Taiki Nakamura, Zama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/099,019

(22) Filed: Nov. 16, 2020

(65) Prior Publication Data
US 2021/0164536 A1 Jun. 3, 2021

(30) Foreign Application Priority Data

Nov. 29, 2019 (JP) .............................. JP2019-216670

(51) Int. Cl.
*F16F 15/14* (2006.01)

(52) U.S. Cl.
CPC ........ *F16F 15/145* (2013.01); *F16F 2222/08* (2013.01); *F16F 2230/04* (2013.01); *F16F 2230/10* (2013.01); *F16F 2230/36* (2013.01); *F16F 2232/00* (2013.01)

(58) Field of Classification Search
CPC ...... F16F 15/1208; F16F 15/14; F16F 15/145; F16F 15/161; F16F 15/167; F16F 2222/08; F16F 2230/04; F16F 2230/06; F16F 2230/10; F16F 2232/00
See application file for complete search history.

(56) References Cited

U.S. PATENT DOCUMENTS

| | | | | |
|---|---|---|---|---|
| 5,761,969 | A * | 6/1998 | Vollett | F16F 15/161 464/68.3 |
| 9,556,944 | B2 * | 1/2017 | Sekiguchi | F16H 45/02 |
| 9,958,027 | B2 * | 5/2018 | Sekiguchi | F16H 45/02 |
| 10,001,192 | B2 * | 6/2018 | Horita | F16F 15/31 |
| 10,458,512 | B2 * | 10/2019 | Nishida | F16F 15/145 |
| 10,550,912 | B2 * | 2/2020 | Ishibashi | F16F 15/145 |
| 10,788,099 | B2 * | 9/2020 | Nakamura | F16F 15/1457 |
| 10,816,058 | B2 * | 10/2020 | Ishibashi | F16F 15/145 |
| 11,162,558 | B2 * | 11/2021 | Nakamura | B62D 25/088 |
| 2015/0275014 | A1 | 10/2015 | AlMA et al. | |
| 2018/0306271 | A1 * | 10/2018 | Horita | F16F 15/3153 |
| 2018/0347662 | A1 * | 12/2018 | Iwane | F16F 15/145 |
| 2019/0170212 | A1 | 8/2019 | ISHIBASHI et al. | |
| 2021/0156453 | A1 * | 5/2021 | Nakamura | F16F 15/145 |

FOREIGN PATENT DOCUMENTS

| | | |
|---|---|---|
| JP | 2014-101941 A | 6/2014 |
| JP | 2019-100498 A | 6/2019 |
| WO | WO 2014/068750 A1 | 5/2014 |

* cited by examiner

*Primary Examiner* — Adam D Rogers
(74) *Attorney, Agent, or Firm* — Oblon, McCelland, Maier & Neustadt, L.L.P.

(57) ABSTRACT

A centrifugal pendulum damper in which a rolling mass can be lubricated by a simple structure without limiting vibration damping performance. The pendulum damper comprises: a rotary member; an inertia body arranged concentrically with the rotary member; a rolling mass held in a retainer on an outer circumference of the rotary member; a recess formed on an inner circumference of the inertia body; and a raceway surface formed on an inner circumference of the recess to which the rolling mass is contacted. In the centrifugal pendulum damper, oil remaining in the recess is discharged out of the recess through an oil passage.

17 Claims, 13 Drawing Sheets

CENTRIFUGAL PENDULUM DAMPER

The present disclosure claims the benefit of Japanese Patent Application No. 2019-216670 filed on Nov. 29, 2019 with the Japanese Patent Office, the disclosure of which is incorporated herein by reference in its entirety.

BACKGROUND

Field of the Disclosure

The present disclosure relates to the art of a centrifugal pendulum damper that damps vibrations resulting from pulsation of torque generated by a prime mover, and especially to a wet-type centrifugal pendulum damper in which a slide members and movable members are lubricated by oil.

Discussion of the Related Art

In the conventional art, for example, a dynamic damper is mounted on a crank shaft of an engine or an input shaft of a transmission to damp torsional vibrations on rotary members resulting from torque pulse. Specifically, the dynamic damper damps the torsional vibrations by dispersing a resonance point utilizing elastic forces of springs and inertia forces of pendulum masses.

One example of the dynamic damper adopted as a torsional vibration damper is described in JP-A-2019-100498. The torsional vibration damper taught by JP-A-2019-100498 comprises a disc-shaped rotary member, an annular-shaped inertia body serving as a mass of the torsional vibration damper, a rolling member connecting the rotary member and the inertia body. In the torsional vibration damper taught by JP-A-2019-100498, a plurality of support sections are formed on an outer circumference of the rotary member, and the rolling member is held in each of the support sections while being restricted to oscillate in a circumferential direction but allowed to move in a radial direction. A plurality of notches opening wider than a diameter of the rolling member are formed on an inner circumference of the inertia body, and a raceway surface is formed on an inner circumference of each of the notches. In the torsional vibration damper taught by JP-A-2019-100498, torque of the rotary member is transmitted to the inertia body through the rolling members held in the support sections.

According to the teachings of JP-A-2019-100498, the torsional vibration damper is immersed in an oil, or the oil is supplied to the rolling members or the raceway surfaces. In order not to disturb rolling motion of the rolling member by viscosity of the oil, the torsional vibration damper taught by JP-A-2019-100498 is provided with a wall that changes a flow of the oil.

WO 2014/068750 A1 describes a torsional vibration damping device as a pendulum dynamic damper. The torsional vibration damping device taught by WO 2014/068750 A1 comprises: a rotary member that is rotated by a torque; an inertial mass as a pendulum that is oscillated by pulsation of the torque of the rotary member; and a chamber that is formed on the rotary member to hold the inertial mass and the oil liquid-tightly. According to the teachings of WO 2014/068750 A1, an amount of the oil is adjusted in a manner such that the inertial mass will not be brought into contact with an oil film of the lubrication oil centrifugally adhering to a radially outer section of an inner face of the chamber. The torsional vibration damping device taught by WO 2014/068750 A1 further comprises: an oil reservoir as a groove formed on a raceway surface in the circumferential direction.

JP-A-2014-101941 describes a torsional vibration damper comprising a feeding passage for supplying oil to a chamber holding a rolling member as a pendulum mass, and a discharging passage for discharging the oil from the chamber. According to the teachings of JP-A-2014-101941, an amount of oil held in the chamber is controlled in accordance with a rotational speed of the rotary member by regulating oil pressure in the feeding passage and opening or closing the discharging passage.

In the torsional vibration damper taught by JP-A-2019-100498, the rolling members roll on the raceway surfaces and displaced radially outwardly in the support sections. Therefore, in order to prevent abrasion of those members, the oil is supplied to the rolling members. However, if the oil is applied to the rolling member excessively, movement of the rolling member may be hindered by viscosity of the oil and consequently vibration damping effect may be reduced. In order to avoid such disadvantage, according to the teachings of JP-A-2019-100498, the torsional vibration damper is provided with the wall and the cover to change the flowing direction of the oil. Nonetheless, an advantageous effect of the wall and the cover is rather limited. That is, the notch of the inertia body is depressed toward radially outer side and hence the oil displaced centrifugally remains in the notches. However, the cover and the wall described in JP-A-2019-100498 is adapted to restrict an amount of the oil flowing toward the rolling member by changing a direction of the oil flowing in the circumferential direction toward the rolling member. Therefore, the oil flowing toward the rolling member may not be blocked completely.

According to the teachings of WO 2014/068750 A1, the chamber holding the inertial mass is filled with a predetermined amount of lubricating oil. However, although the amount of oil in the chamber can be controlled in the torsional vibration damping device taught by WO 2014/068750 A1, WO 2014/068750 A1 is silent about a structure to discharge the oil from the chamber. In the torsional vibration damping device taught by WO 2014/068750 A1, therefore, the oil may be applied to the rolling member excessively when the rotary member is stopped or rotated at a low speed. In those cases, the rolling member may not be allowed to oscillate smoothly in the chamber, and consequently, vibration damping performance of the torsional vibration damping device may be limited.

According to the teachings of JP-A-2014-101941, the feeding passage and the discharging passage are formed in the rotary member so that an amount of the oil held in the chamber is controlled to a desired amount. However, JP-A-2014-101941 is silent about how to control an amount of the oil interposed between the rolling member and the raceway surface. In addition, in order to control an amount of the oil in the chamber of the torsional vibration damper taught by JP-A-2014-101941, it is necessary to arrange a hydraulic circuit and a hydraulic control unit for regulating pressure in the feeding passage, and a control valve and a control device for opening and closing the discharging passage.

SUMMARY

Aspects of preferred embodiments of the present application have been conceived noting the foregoing technical problems, and it is therefore an object of the present disclosure to provide a centrifugal pendulum damper in which a rolling mass can be lubricated effectively by a simple structure, without limiting vibration damping effect.

The embodiment of the present disclosure relates to a centrifugal pendulum damper comprising: a rotary member that is rotated by torque transmitted thereto; an inertia body that is arranged coaxially with the rotary member while being allowed to oscillate relatively to the rotary member; a rolling mass that connects the rotary member to the inertia body in a torque transmittable manner; a retainer that is formed on an outer circumference of the rotary member to hold the rolling mass such that the rolling mass is restricted to oscillate in a circumferential direction but allowed to reciprocate in a radial direction to be contacted to the inertia body; a recess as an arcuate depression that is formed on an inner circumference of the inertia body to hold the rolling mass, and whose curvature radius is longer than a radius of the rolling mass; and a raceway surface formed on an inner circumference of the recess to which an outer circumferential surface of the rolling mass is contacted. In the centrifugal pendulum damper, torque of the rotary member is transmitted to the inertia body through the rolling mass to damp torsional vibrations of the rotary member. In order to achieve the above-explained objective, according to the exemplary embodiment of the present disclosure, the centrifugal pendulum damper is provided with: an oil that lubricates the rolling mass and members contacted to the rolling mass; and an oil passage that guides the oil remaining in the recess while being subjected to a centrifugal force to flow out of the raceway surface.

In a non-limiting embodiment, the oil passage may include a hole that is formed on the inertia body from the raceway surface toward the outer circumferential surface of the inertia body in a radial direction so as to allow the oil remaining in the recess to flow out of the raceway surface.

In a non-limiting embodiment, the oil passage may include a through hole that penetrates through the inertia body between the raceway surface and the outer circumferential surface of the inertia body in the radial direction so as to allow the oil remaining in the recess of the inertia body to flow out of the raceway surface.

In a non-limiting embodiment, the oil passage may include: an axial through hole that is formed on the inner circumference of the recess of the inertia body at a predetermined portion other than the raceway surface to open toward the raceway surface; and a radial through hole that penetrates through the inertia body between the axial through hole and the outer circumferential surface of the inertia body in the radial direction so as to allow the oil remaining in the recess of the inertia body to flow out of the raceway surface.

In a non-limiting embodiment, the oil passage may include a groove that is formed on at least one of the raceway surface of the inertia body and the outer circumferential surface of the rolling mass so as to allow the oil remaining in the recess of the inertia body to flow out of the raceway surface.

In a non-limiting embodiment, the groove may be formed on the at least one of the raceway surface of the inertia body and the outer circumferential surface of the rolling mass in the circumferential direction.

In a non-limiting embodiment, the groove may be formed on the at least one of the raceway surface of the inertia body and the outer circumferential surface of the rolling mass in an axial direction.

In a non-limiting embodiment, the groove may be formed on the at least one of the raceway surface of the inertia body and the outer circumferential surface of the rolling mass obliquely with respect to the axial direction and the circumferential direction of the inertia body or the rolling mass.

In a non-limiting embodiment, the raceway surface may include a slant raceway surface that is inclined axially inwardly toward a rotational center axis of the inertia body, and the outer circumferential surface of the rolling mass includes a slant contact surface that is inclined axially inwardly toward a rotational center axis of the rolling mass. In addition, an inclination of the slant contact surface may conform to an inclination of the slant raceway surface.

In a non-limiting embodiment, the oil passage may include a clearance between the slant raceway surface and the slant contact surface that allows the oil remaining in the recess of the inertia body to flow out of the slant raceway surface.

In the centrifugal pendulum damper according to the exemplary embodiment of the present disclosure, the rolling mass and members contacted to the rolling mass are lubricated by the oil. According to the exemplary embodiment of the present disclosure, therefore, abrasion of the rolling masses, the retainers, the raceway surfaces and so on may be prevented by a simple structure. If the oil remains in the deepest section in the raceway surface 7 formed in the recess of the inertia body more than necessary, oscillating motion of the rolling mass along the raceway surface is hindered by viscosity resistance of the oil. In order to avoid such disadvantage, according to the exemplary embodiment of the present disclosure, the oil remaining in the recess of the inertia body between the rolling mass and the raceway surface is discharged centrifugally from the raceway surface through the oil passage. According to the exemplary embodiment of the present disclosure, therefore, the rolling mass is allowed to serve as a pendulum mass properly to ensure the vibration damping performance of the centrifugal pendulum damper. As descried, the oil passage includes the through hole and the groove and the formed on at least one of the rolling member and the inertia body, and a clearance maintained between the rolling member and the inertia body. According to the exemplary embodiment of the present disclosure, therefore, abrasion of the rolling mass, the rotary member, the inertia body and so on may be prevented by a simple structure without limiting vibration damping performance of the centrifugal pendulum damper.

In the case of forming the slant raceway surface on the inertia body and the slant contact surface on the rolling mass, the oil remaining in the recess of the inertia body can be discharged from the recess smoothly by the centrifugal force through the clearance between the slant raceway surface and the slant contact surface. In this case, therefore, the rolling mass is allowed to serve as a pendulum mass properly to ensure the vibration damping performance of the centrifugal pendulum damper. In addition, the rolling mass having the slant contact surface can be aligned automatically with the inertia body 3 having the slant raceway surface by the centrifugal force. In this case, therefore, a structure of the centrifugal pendulum damper may be simplified, and the rolling mass is allowed to oscillate more effectively on the slant raceway surface to further improve the vibration damping performance of the centrifugal pendulum damper.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Preferred embodiments of the present disclosure will now be explained with reference to the accompanying drawings.

Figure 1:
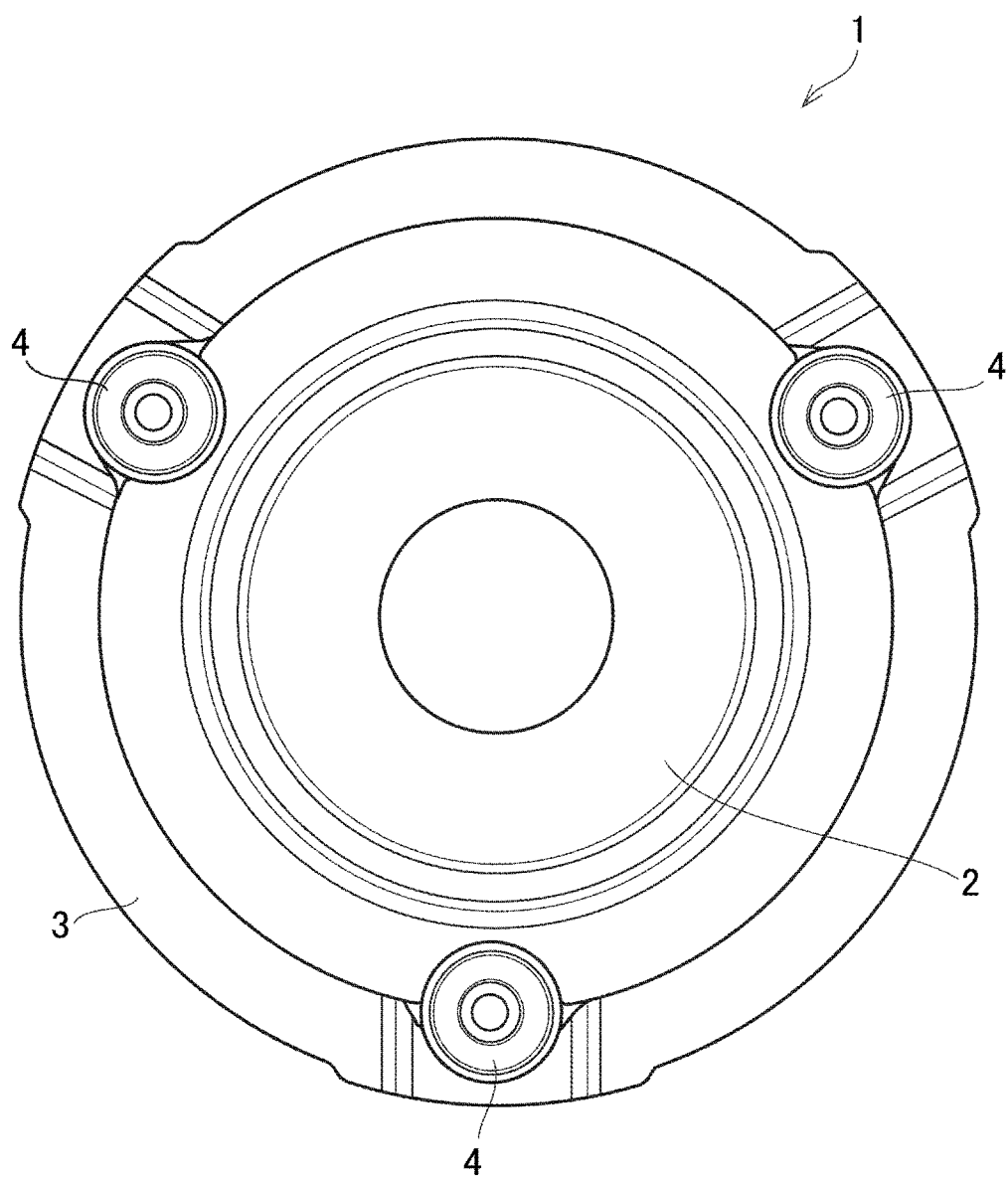
FIG. 1 is a front view showing the centrifugal pendulum damper according to the exemplary embodiment of the present disclosure.

Here will be explained a fundamental structure of the centrifugal pendulum damper according to the exemplary embodiment of the present disclosure with reference to FIGS. 1 to 3. The centrifugal pendulum damper (as will be simply called the "damper" hereinafter) 1 comprises: a rotary member 2, an inertia body 3, a rolling mass 4, a retainer 5, a recess 6, a raceway surface 7 and a contact surface 8.

The rotary member 2 as a circular plate member having a center hole is mounted on a predetermined shaft such as an output shaft of the engine or an input shaft of a transmission so that the rotary member 2 is rotated integrally therewith. A plurality of retainers 5 are formed on an outer circumference 2a of the rotary member 2, and the rolling mass 4 is held in each of the retainers 5.

The inertia body 3 is an annular plate member having a predetermined mass, and inertia body 3 is arranged coaxially with the rotary member 2 while being allowed to oscillate relatively to the rotary member 2. A plurality of raceway surfaces 7 are formed on an inner circumference 3a of the inertia body 3, and the inertia body 3 is supported by the rolling masses 4, each of which is held between the retainer 5 and a recess 6 of the raceway surface 7.

Each of the rolling mass 4 serves as a centrifugal roller having a predetermined mass. That is, the rotary member 2 is connected to the inertia body 3 through the rolling masses 4. Specifically, each of the rolling masses 4 is held in the retainer 5 of the rotary member 2 while being allowed to rotate and to move in a radial direction so that each of the rolling masses 4 is centrifugally pushed onto the raceway surface 7 of the inertia body 3 when the rotary member 2 is rotated. Consequently, the torque of the rotary member 2 is transmitted to the inertia body 3 through the rolling masses 4. According to the exemplary embodiment of the present disclosure, the rotary member 2 has a two-part structure including a first mass 4a and a second mass 4b so that the rolling mass 4 may be assembled easily with the rotary member 2 and the inertia body 3.

The first mass 4a is a pulley member comprising a boss 4c formed on a center of the first mass 4a, a shaft hole 4d formed in the boss 4c, and an outer circumferential surface 4f serving as a contact surface 8 contacted to the raceway surface 7. In addition, a bearing 9 as a ball bearing or a slide bearing (i.e., a bush) is fitted onto the boss 4c so that the rolling mass 4 is allowed to rotate smoothly in the retainer 5 and on the raceway surface 7. Instead, an outer circumferential surface of the boss 4c of the rolling mass 4 may be adapted as a slide bearing to omit the bearing 9.

The second mass 4b is also a pulley member comprising a shaft 4e formed on a center of the second mass 4b, and an outer circumferential surface 4f serving as a contact surface 8 contacted to the raceway surface 7. The shaft 4e of the second mass 4b is tightly inserted into the shaft hole 4d of the first mass 4a so that the second mass 4b is combined with the first mass 4a to form the rolling mass 4.

Specifically, the shaft 4e of the second mass 4b is inserted into the shaft hole 4d of the first mass 4a in such a manner that the bearing 9 is held in the retainer 5 and that the first mass 4a and the second mass 4b are held in the recess 6 of the raceway surface 7. Consequently, the rolling mass 4 is engaged with the retainer 5 of the rotary member 2, and the rotary member 2 is connected to the inertia body 3 through the rolling mass 4. According to the exemplary embodiment of the present disclosure, three rolling masses 4 are arranged in the damper 1. Accordingly, three retainers 5 are formed on the rotary member 2 at regular intervals and three raceway surfaces 7 are formed on the inertia body 3 at regular intervals.

Figure 3:
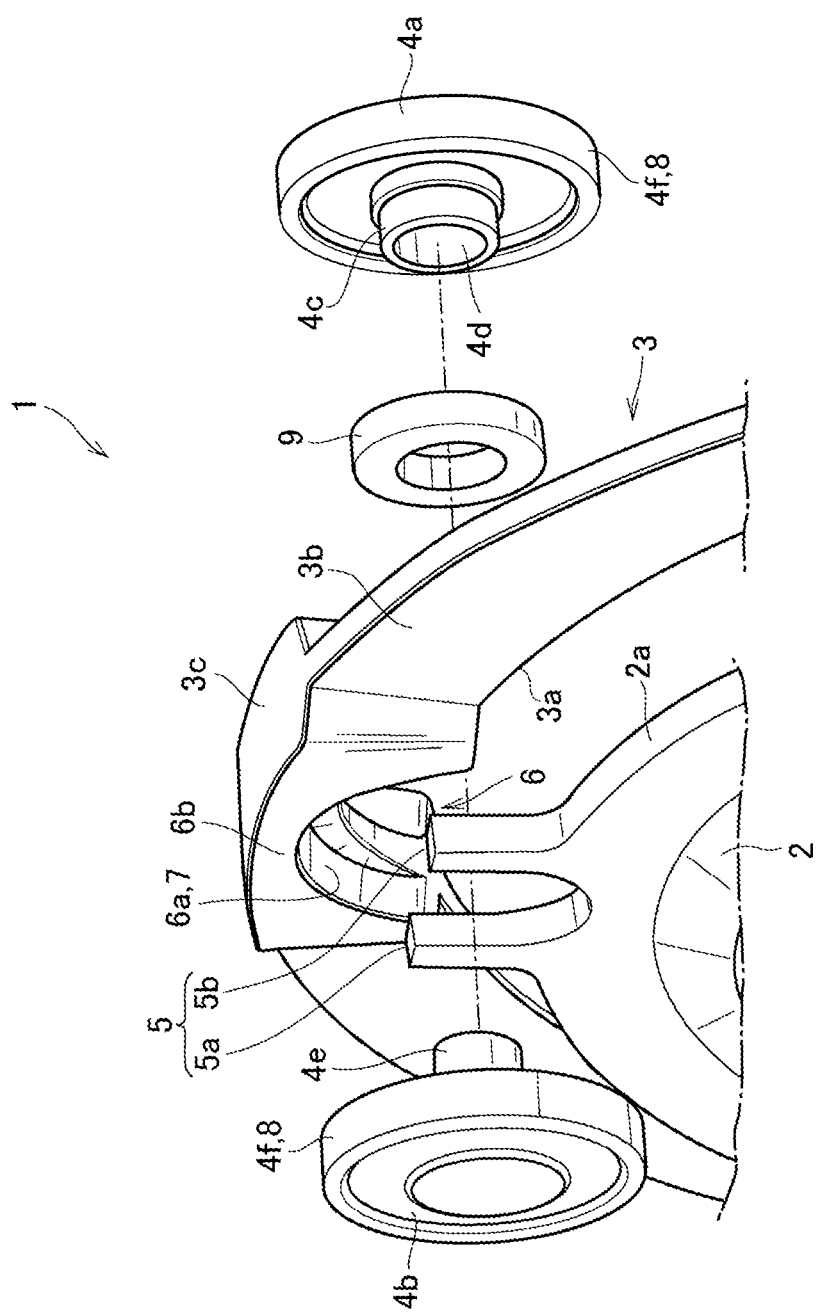
FIG. 3 is an exploded view showing constitutional elements of the torsional vibration damper shown in FIG. 1.

As illustrated in FIG. 3, each of the retainer 5 comprises a pair of column-shaped stoppers 5a and 5b extending radially outwardly from the outer circumference 2a of the rotary member 2, and in parallel to each other.

Specifically, the bearing 9 fitted onto the boss 4c of the rolling mass 4 is held between the stoppers 5a and 5b of the retainer 5, and hence an oscillation of the rolling mass 4 in the circumferential direction is restricted by the stoppers 5a and 5b. Nonetheless, a length of each of the stoppers 5a and 5b of the retainer 5 is individually longer than a diameter of the bearing 9, therefore, the rolling mass 4 is allowed to reciprocate in the radial direction between the stoppers 5a and 5b. Accordingly, when the rotary member 2 is rotated, the rolling masses 4 revolve around the rotational center axis of the rotary member 2 while being displaced radially outwardly by a centrifugal force.

The recess 6 as an arcuate depression is formed by depressing the inner circumference 3a of the inertia body 3 radially outwardly while being curved along the outer circumferential surface 4f as the contact surface 8 of the rolling mass 4. An inner circumferential surface 6a of the recess 6 serves as the above-mentioned raceway surface 7 to which the outer circumferential surface 4f as the contact surface 8 of the rolling mass 4 is centrifugally contacted while oscillating within the raceway surface 7. The raceway surface 7 is formed on both sides of a base portion 3b of the inertia body 3, and hence a thickness of the pair of raceway surface 7 in the axial direction is thicker than a thickness of the base portion 3b of the inertia body 3 in the axial direction. In other words, the recess 6 is formed on both sides of the base portion 3b of the inertia body 3.

A curvature radius of the raceway surface 7 is slightly longer than a radius of the rolling mass 4 between a rotational center of the rolling mass 4 and the contact surface 8. However, a curvature radius of the raceway surface 7 is shorter than an outer diameter of the rotary member 2 between the rotational center axis and the outer circumference 2a, and an inner diameter of the inertia body 3 between the rotational center axis and the inner circumference 3a.

As described, both of the outer circumferential surface 4f of the first mass 4a and the second mass 4b serve as the contact surface 8, respectively. Therefore, the raceway surface 7 is formed on both sides of the base portion 3b of the inertia body 3 to receive the contact surfaces 8 of the rolling mass 4, and an aligning rib 6b is formed on the inertia body 3 between the pair of raceway surfaces 7.

Figure 2:
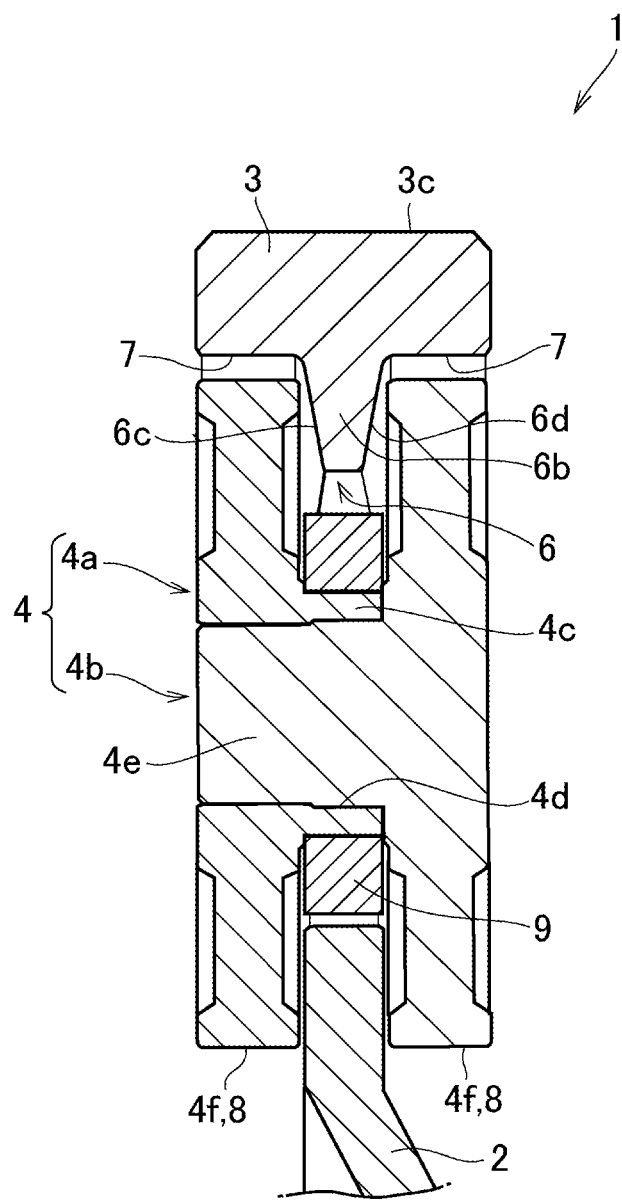
FIG. 2 is a partial cross-sectional view showing a cross-section of a radially outer section of the centrifugal pendulum damper shown in FIG. 1.

As illustrated in FIG. 2, the aligning rib 6b as a plate section protrudes radially inwardly from a width center of the recess 6 toward the rotational center axis, so that the aligning rib 6b is interposed between the first mass 4a and the second mass 4b to align a relative position of the rolling mass 4 with respect to the recess 6. To this end, the aligning rib 6b comprises an inclined surface 6c opposed to the first mass 4a and an inclined surface 6d opposed to the second mass 4b, and the inclined surface 6c and the inclined surface 6d are inclined such that a thickness of the aligning rib 6b is reduced toward the rotational center axis of the inertia body 3. That is, the thickness of the aligning rib 6b between the inclined surface 6c and the inclined surface 6d is thickest at a radially outermost portion, and the thickness of the aligning rib 6b at the radially outermost portion is substantially identical to a clearance between the first mass 4a and the second mass 4b in the axial direction. When the rotary member 2 is rotated, the rolling mass 4 is centrifugally displaced radially outwardly toward the raceway surface 7. In this situation, a clearance between the first mass 4a and the inclined surface 6c, and a clearance between the second mass 4b and the inclined surface 6d are reduced gradually. Eventually, the contact surface 8 of the rolling mass 4 comes into contact to the raceway surface 7, and in this situation, the above-mentioned clearances between the rolling mass 4 and the aligning rib 6b are reduced to zero. As a result, the rolling mass 4 is aligned in the recess 6 with the inertia body 3 and the rotary member 2 in the axial direction.

When the rotary member 2 is rotated by a torque applied thereto, the rolling masses 4 held in the retainers 5 revolves around the rotational center axis of the rotary member 2 while being subjected to the centrifugal force in accordance with a distance from the rotational center axis. The centrifugal force is increased with an increase in a rotational speed of the rotary member 2, and when the centrifugal force overwhelms the gravitational force, the rolling masses 4 are displaced radially outwardly between stoppers 5a and 5b of the retainers 5. Eventually, when the rotational speed of the rotary member 2 is increased to a predetermined level, the rolling masses 4 are centrifugally pushed onto the raceway surfaces 7 of the inertia body 3. Consequently, the rotary member 2 and the inertia body 3 are connected to each other through the rolling masses 4. In this situation, if the torque is not pulsated, pulsation of the torque is rather small, or the rotational speed of the rotary member 2 is significantly high, each of the rolling masses 4 individually transmits the torque of the rotary member 2 to the inertia body 3 without oscillating on the raceway surface 7. As a result, the rotary member 2 and the inertia body 3 are rotated integrally. In other words, the damper 1 is rotated integrally.

When the torque applied to the rotary member 2 is pulsated, an angular acceleration of the rotary member 2 is changed, and consequently the inertia body 3 is oscillated relatively to the rotary member 2 by an inertia force. In this situation, each of the rolling masses 4 rolls along the raceway surface 7. As described, since the curvature radius of the raceway surface 7 is shorter than the curvature radius of the inner circumference of the inertia body 3, the rolling mass 4 is pushed back radially inwardly the raceway surface 7, as the rolling mass 4 approaches a circumferential end of the raceway surface 7. Consequently, the rolling mass 4 is centrifugally displaced radially outwardly again, and a component of force resulting from such displacement of the rolling mass 4 is applied to the inertia body 3 in the direction to bring the rolling mass 4 into contact to an intermediate position in the raceway surface 7. As a result, the inertia body 3 is oscillated relatively to the rotary member 2. That is, the inertia body 3 is oscillated relatively to the rotary member 2 by the pulsation of the torque applied to the rotary member 2. As described, the rolling masses 4 are restricted to oscillate in the circumferential direction but allowed to reciprocate in the radial direction. Therefore, a reaction force of the rotary member 2 acting in the circumferential direction resulting from the oscillating motion of the inertia body 3 serves as a vibration damping torque to damp the torsional vibrations on the rotary member 2. Specifically, the pulsation of the torque of the rotary member 2 is transmitted to the inertia body 3 through the rolling masses 4, and the inertia body 3 is rotated in the opposite direction to the rotational direction of the rotary member 2. Consequently, vibrations of the rotary member 2 resulting from the pulsation of the torque applied thereto is damped by the inertia moment of the inertia body 3. Thus, the vibrations of the rotary member 2 resulting from torque pulse may be damped effectively by the damper 1 according to the embodiment of the present disclosure.

As described, in the damper 1, the rolling masses 4 come into contact to the retainers 5 and the raceway surfaces 7 respectively by rotating the rotary member 2. In order to protect the rolling masses 4, the retainers 5, the raceway surfaces 7 and so on from abrasion, according to the exemplary embodiment of the present disclosure, oil is applied to the rolling masses 4.

Figure 4:
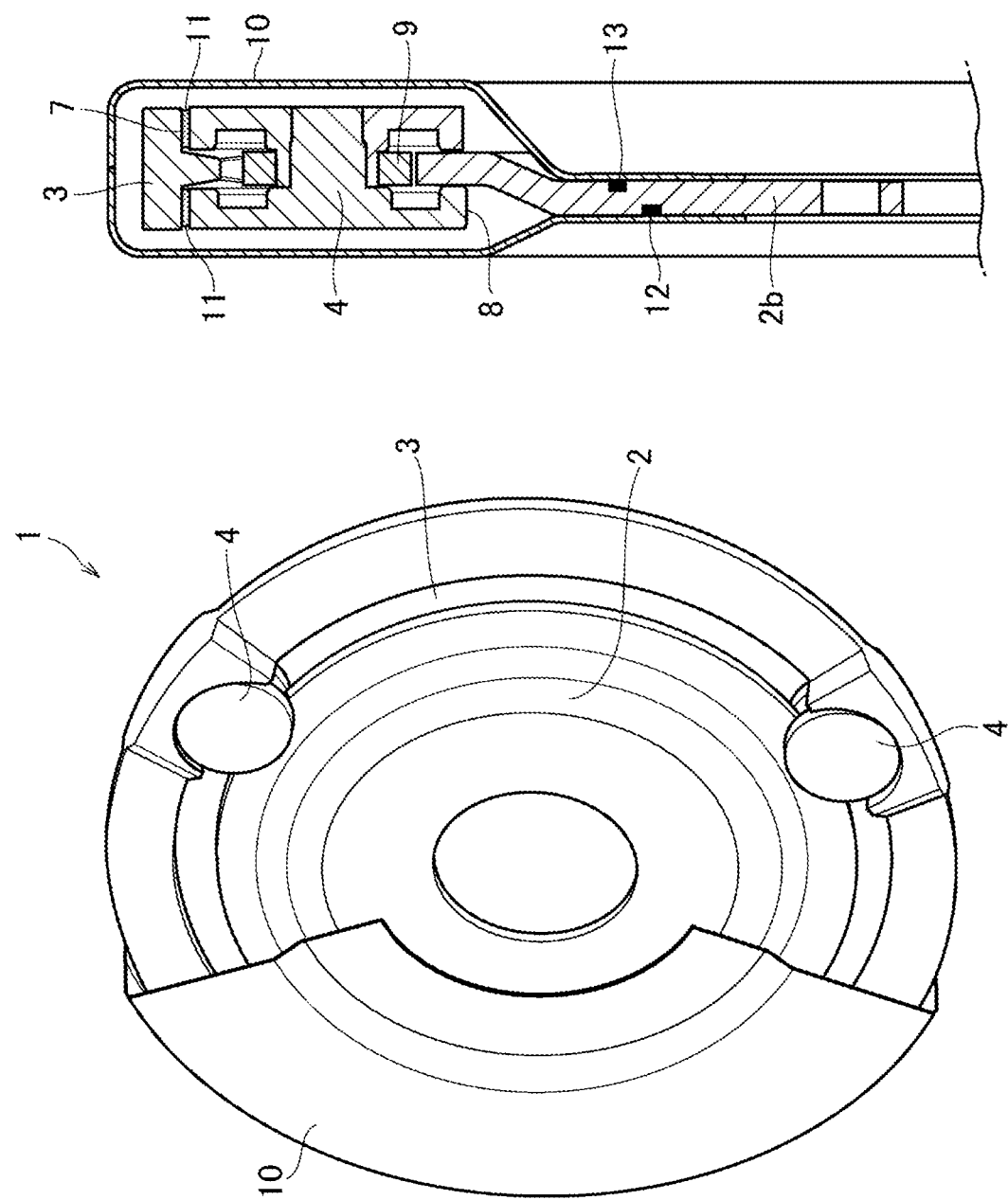
FIG. 4 is a cross-sectional view and a perspective view showing a cover of the damper respectively.

For example, in a case of arranging the damper 1 in a housing of a vehicular transmission (not shown), the damper 1 may be lubricated by lubrication oil of the transmission. According to the exemplary embodiment of the present disclosure, as illustrated in FIG. 4, the damper 1 is covered with a cover 10, and oil 11 is introduced into the cover 10.

The cover 10 is made of thin plate material covering the movable members of the damper 1 such as the rotary member 2, the inertia body 3, the rolling masses 4 and so on. As illustrated in FIG. 4, the cover 10 is attached to a base portion 2b of the rotary member 2 so that the cover 10 is rotated integrally with the rotary member 2. In order to seal the cover 10 in a liquid-tight condition, a sealing member 12 is interposed between one surface of the rotary member 2 and the cover 10, and a sealing member 13 is interposed between the other surface of the rotary member 2 and the cover 10. Therefore, the oil 11 can be held in the cover 10 without leakage. In addition, given that the damper 1 is arranged adjacent to a flywheel disposed downstream of an engine (neither of which are shown) while being exposed, the damper 1 can be protected from dust and water by the cover 10.

Figure 5:
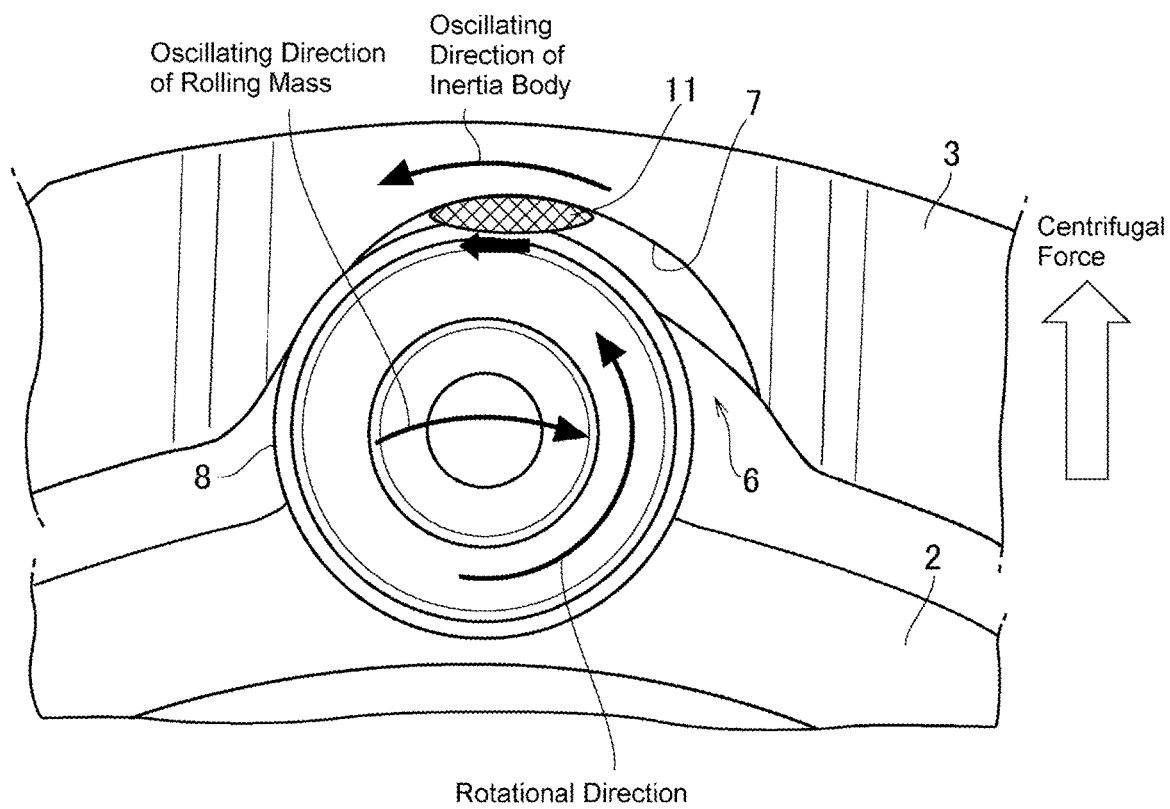
FIG. 5 is a partial enlarged view showing oil remaining in a recess of an inertia body of a centrifugal pendulum damper according to the conventional art.
Figure 6:
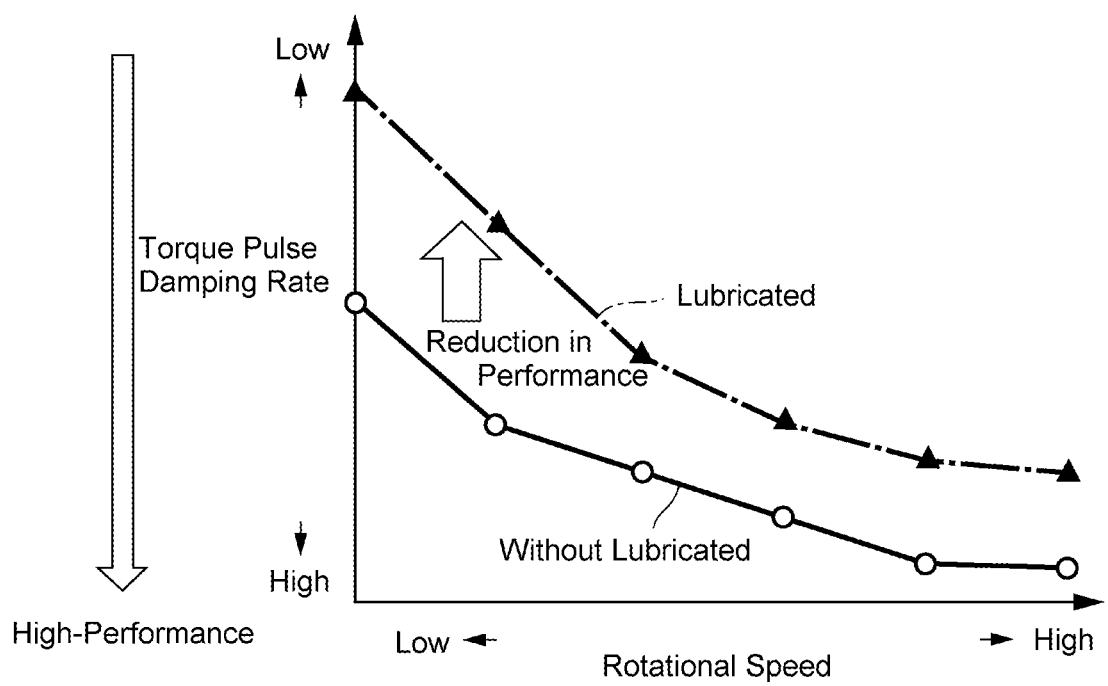
FIG. 6 is a graph indicating reduction in vibration damping performance of the centrifugal pendulum damper according to the conventional art due to lubrication by oil.

If the oil is interposed excessively between the rolling mass 4 and the raceway surface 7, the rolling mass 4 may not oscillate smoothly along the raceway surface 7 due to viscosity resistance of the oil 11. Specifically, as illustrated in FIG. 5, the oil 11 is centrifugally flown radially outwardly toward an outermost section of the raceway surface 7 (i.e., a deepest section in the recess 6) by rotating the rotary member 2. Consequently, the oil 11 remains in the deepest section in the raceway surface 7 more than necessary to lubricate the rolling mass 4, as long as the rotary member is rotated at a speed higher than a predetermine level. In this situation, the oscillating motion of the rolling mass 4 on the raceway surface is hindered by the viscosity resistance of the oil 11. In this situation, therefore, vibration damping performance of the damper 1 may be reduced. As indicated in FIG. 6, in a case of lubricating a conventional centrifugal pendulum damper by oil, vibration damping performance (i.e., pulsation damping rate) of the centrifugal pendulum damper is reduced approximately 10 to 30% compared to a centrifugal pendulum damper that is not lubricated by the oil.

In order to avoid such reduction in the vibration damping performance of the damper 1 while preventing abrasion of the constitutional elements of the damper 1, according to the exemplary embodiment of the present disclosure, the damper 1 is provided with an oil passage 20 that discharges the oil 11 remaining in the recess 6 from the raceway surface 7 of the inertia body 3. Examples of the oil passage 20 will be explained with reference to FIGS. 7 to 13. In FIGS. 7 to 13, common reference numerals are allotted to the elements shown in FIGS. 1 to 4.

Figure 7:
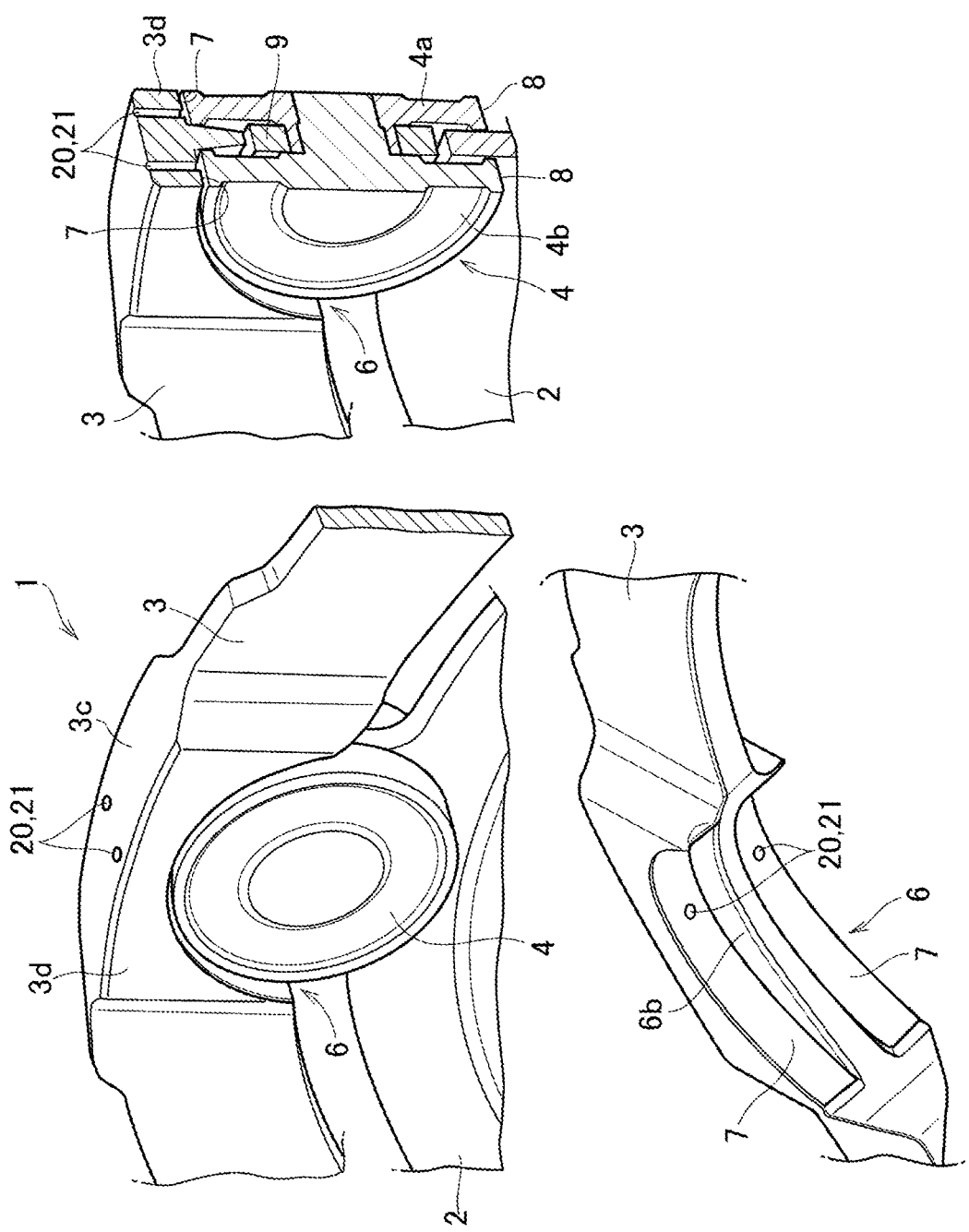
FIG. 7 is a partial enlarged view showing through holes penetrating though a pair of the raceway surfaces.

In the example shown in FIG. 7, in order to drain the oil remaining the recess 6 of the inertia body 3 to the outside of the raceway surface 7, a through hole 21 is formed in the inertia body 3 to serve as the oil passage 20. Specifically, the through hole 21 penetrates through a thicker section 3d of the inertia body 3 in the radial direction from the raceway surface 7 to an outer circumferential surface 3c of the inertia body 3.

As illustrated in FIG. 7, the through hole 21 is formed not only in the raceway surface 7 to which the first mass 4a of the rolling mass 4 is contacted, but also in the raceway surface 7 to which the second mass 4b of the rolling mass 4 is contacted. That is, two through holes 21 are formed in each of the recesses 6 of the inertia body 3. More specifically, each of the through holes 21 penetrates though the radially outermost portion of the raceway surface 7 at which the oil 11 is subjected to the greatest centrifugal force. In other words, each of the through holes 21 penetrates though the radially thinnest portion of the recess 6 to which the rolling mass 4 is contacted in the condition that the inertia body 3 is rotated integrally with the rotary member 2.

Number of the through holes 21 may be altered arbitrarily according to need. For example, a plurality of (e.g., four or more) through holes 21 may be formed in one of the pairs of the raceway surfaces 7. The through hole 21 may also be formed in the recess 6 of the inertia body 3 other than the radially thinnest portion. In addition, the through hole 21 may also be formed to penetrate through the recess 6 of the inertia body 3 diagonally with respect to the radial direction.

Thus, according to the example shown in FIG. 7, the oil 11 remaining between the rolling mass 4 and the recess 6 of the inertia body 3 can be discharged centrifugally to the outside of the raceway surface 7 through the through holes 21. According to the example shown in FIG. 7, therefore, each of the rolling masses 4 is allowed to serve as a pendulum mass properly to ensure the vibration damping performance of the damper 1. In addition, a discharging amount of the oil 11 may be adjusted by altering the number of the through holes 21 or by changing a diameter of each of the through holes 21. According to the example shown in FIG. 7, therefore, the rolling masses 4 are allowed to oscillate smoothly on the raceway surfaces 7, while being lubricated by the oil 11. In addition, the through hole 21 may be formed easily by e.g., a drill. According to the example shown in FIG. 7, therefore, abrasion of the rolling masses 4, the retainers 5, the raceway surfaces 7 and so on may be prevented by a simple structure.

Figure 8:
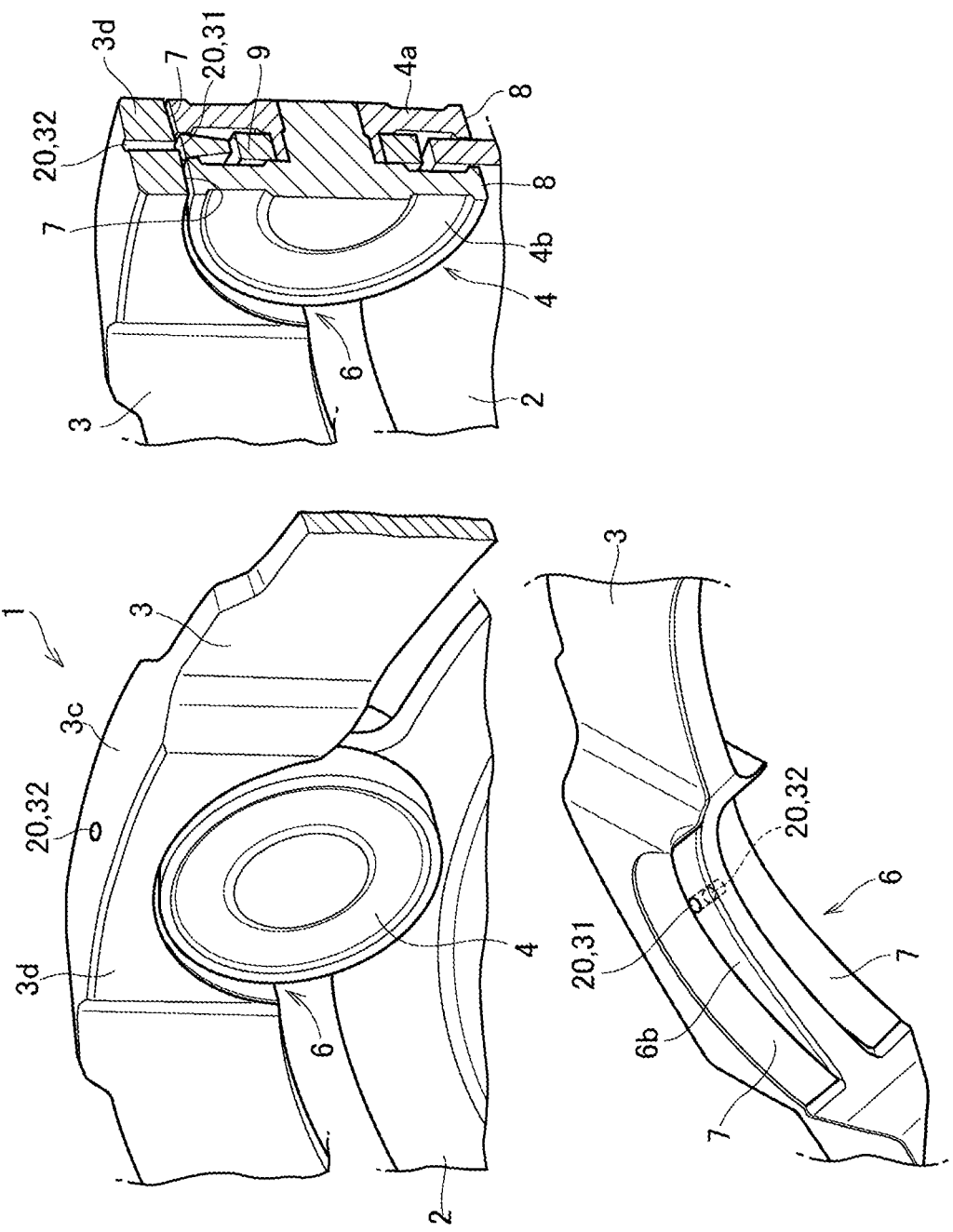
FIG. 8 is a partial enlarged view showing an axial through hole and a radial through hole formed in the inertia body.

According to the example shown in FIG. 8, in order to drain the oil 11 from the recess 6 of the inertia body 3 to the outside of the raceway surface 7, the oil passage 20 comprises an axial through hole 31 and a radial through hole 32 connected to each other.

As illustrated in FIG. 8, the axial through hole 31 is formed in the recess 6 of the inertia body 3 at a predetermined portion other than the raceway surface 7 to open toward each of the raceway surfaces 7 of the pair of the raceway surfaces 7. Specifically, the axial through hole 31 penetrates through the aligning rib 6b of the inertia body 3 in the axial direction at a border between the aligning rib 6b and the raceway surfaces 7. On the other hand, the radial through hole 32 penetrates through the thicker section 3d of the inertia body 3 in the radial direction from the axial through hole 31 to the outer circumferential surface 3c of the inertia body 3.

In the example shown in FIG. 8, only one radial through hole 32 is formed in the raceway surface 7. That is, only one radial through hole 32 is formed in the recesses 6 of the inertia body 3. Specifically, the radial through hole 32 penetrates though the radially outermost portion of the raceway surface 7 at which the oil 11 is subjected to the greatest centrifugal force. In other words, the radial through hole 32 penetrates though the radially thinnest portion of the recess 6 to which the rolling mass 4 is contacted in the condition that the inertia body 3 is rotated integrally with the rotary member 2.

Number of the radial through hole 32 may be altered arbitrarily according to need. That is, a plurality of the radial through hole 32 may be formed in the recess 6. The radial through hole 32 may also be formed in the recess 6 of the inertia body 3 other than the radially thinnest portion. In addition, the radial through hole 32 may also be formed to penetrate through the recess 6 of the inertia body 3 diagonally with respect to the radial direction. Likewise, the axial through hole 31 may also be formed to penetrate through aligning rib 6b of the inertia body 3 diagonally with respect to the axial direction while passing through an opening of the radial through hole 32.

Thus, according to the example shown in FIG. 8, the oil 11 remaining between the rolling mass 4 and the recess 6 of the inertia body 3 can be discharged centrifugally to the outside of the raceway surface 7 through the axial through hole 31 and the radial through hole 32. According to the example shown in FIG. 8, therefore, each of the rolling masses 4 is allowed to serve as a pendulum mass properly to ensure the vibration damping performance of the damper 1. In addition, a discharging amount of the oil 11 may also be adjusted by altering the numbers of the axial through hole 31 and the radial through hole 32, or by changing diameters of the axial through hole 31 and the radial through hole 32. According to the example shown in FIG. 8, therefore, the rolling masses 4 are allowed to oscillate smoothly on the raceway surfaces 7, while being lubricated by the oil 11. In addition, the axial through hole 31 and the radial through hole 32 may also be formed easily by e.g., a drill. According to the example shown in FIG. 8, therefore, abrasion of the rolling masses 4, the retainers 5, the raceway surfaces 7 and so on may be prevented by a simple structure.

Further, according to the example shown in FIG. 8, neither the axial through hole 31 nor the radial through hole 32 penetrates through the raceway surface 7. When rotating the rotary member 2, the raceway surface 7 is subjected to a large load derived from a torque applied thereto through the rolling mass 4 and a pushing force of the rolling mass 4 centrifugally contacted thereto. That is, if an opening or hole is formed on the raceway surface 7, an endurance strength of the raceway surface 7 may be reduced due to stress concentration. However, according to the example shown in FIG. 8, none of the axial through hole 31 and the radial through hole 32 is formed on the raceway surface 7. According to the example shown in FIG. 8, therefore, strength of the raceway surface 7 can be ensured to improve durability of the damper 1.

Figure 9:
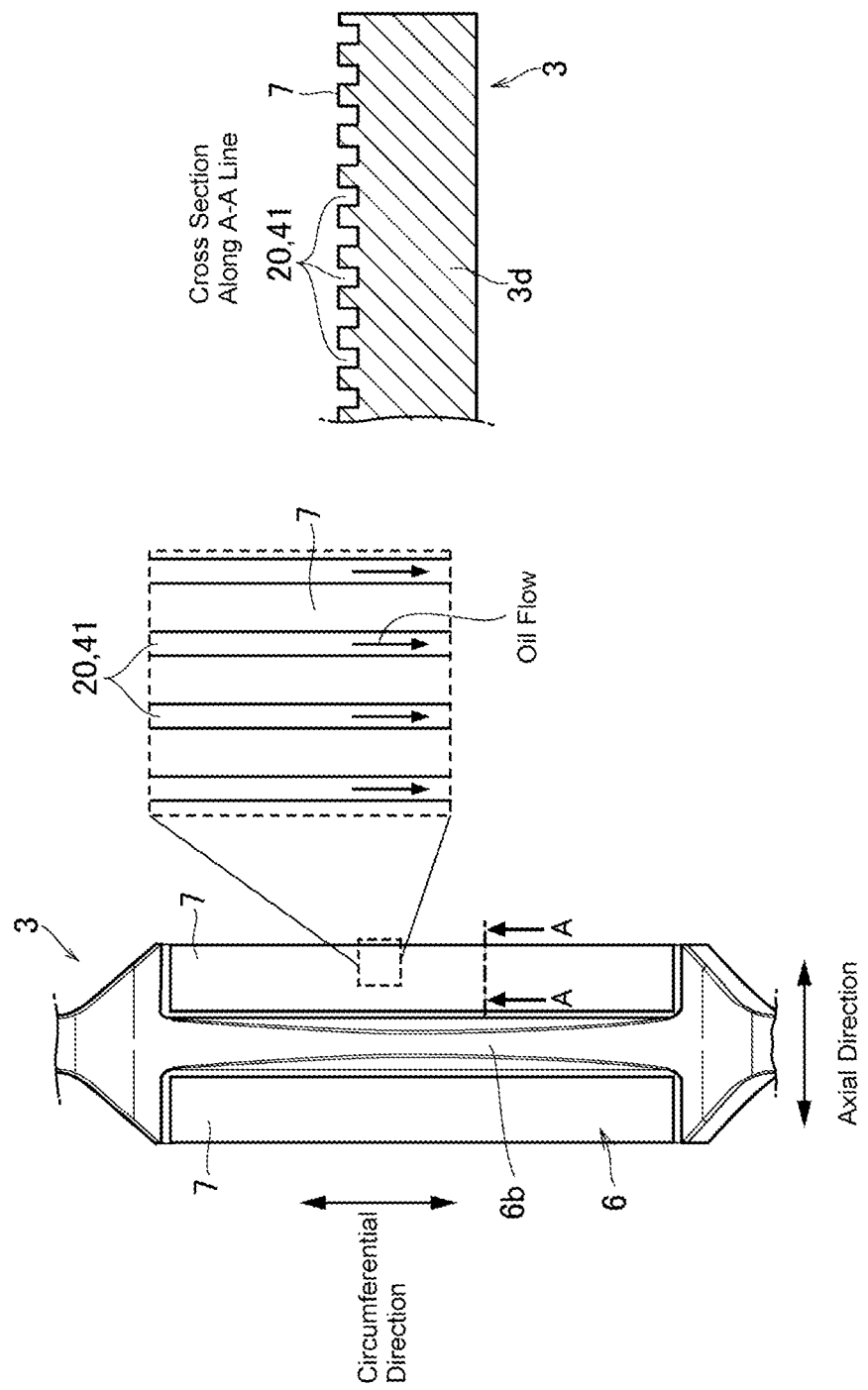
FIG. 9 is a cross-sectional view showing grooves extending on the raceway surface extending in the circumferential direction.

According to the example shown in FIG. 9, in order to drain the oil 11 from the recess 6 of the inertia body 3 to the outside of the raceway surface 7, at least one groove 41 is/are formed on the raceway surface 7 to serve as the oil passage 20. Each of the grooves 41 as a chase extends on the raceway surface 7 in the circumferential direction. According to the example shown in FIG. 9, specifically, a plurality of the grooves 41 are formed not only on the raceway surface 7 to which the first mass 4a of the rolling mass 4 is contacted, but also on the raceway surface 7 to which the second mass 4b of the rolling mass 4 is contacted.

In the example shown in FIG. 9, the each of the grooves 41 individually serves as a clearance to which the oil 11 remaining between the rolling mass 4 and the recess 6 of the inertia body 3 enters. According to the example shown in FIG. 9, therefore, the oil 11 remaining between the rolling mass 4 and the recess 6 of the inertia body 3 is guided to be discharged from the raceway surface 7. Especially, since the grooves 41 extend in the circumferential direction, the oil 11 is allowed to flow smoothly out of the raceway surface 7 with the rotation of the rolling mass 4. For this reason, each of the rolling masses 4 is allowed to serve as a pendulum mass properly to ensure the vibration damping performance of the damper 1. In addition, an amount of the oil 11 discharged from the raceway surface 7 through the grooves 41 may be adjusted by altering number of grooves 41, and a width and depth of each of the grooves 41. According to the example shown in FIG. 9, therefore, the rolling masses 4 are allowed to oscillate smoothly on the raceway surfaces 7, while being lubricated by the oil 11. Further, the grooves 41 may be formed easily by e.g., an end mill. According to the example shown in FIG. 9, therefore, abrasion of the rolling masses 4, the retainers 5, the raceway surfaces 7 and so on may be prevented by a simple structure.

Figure 10:
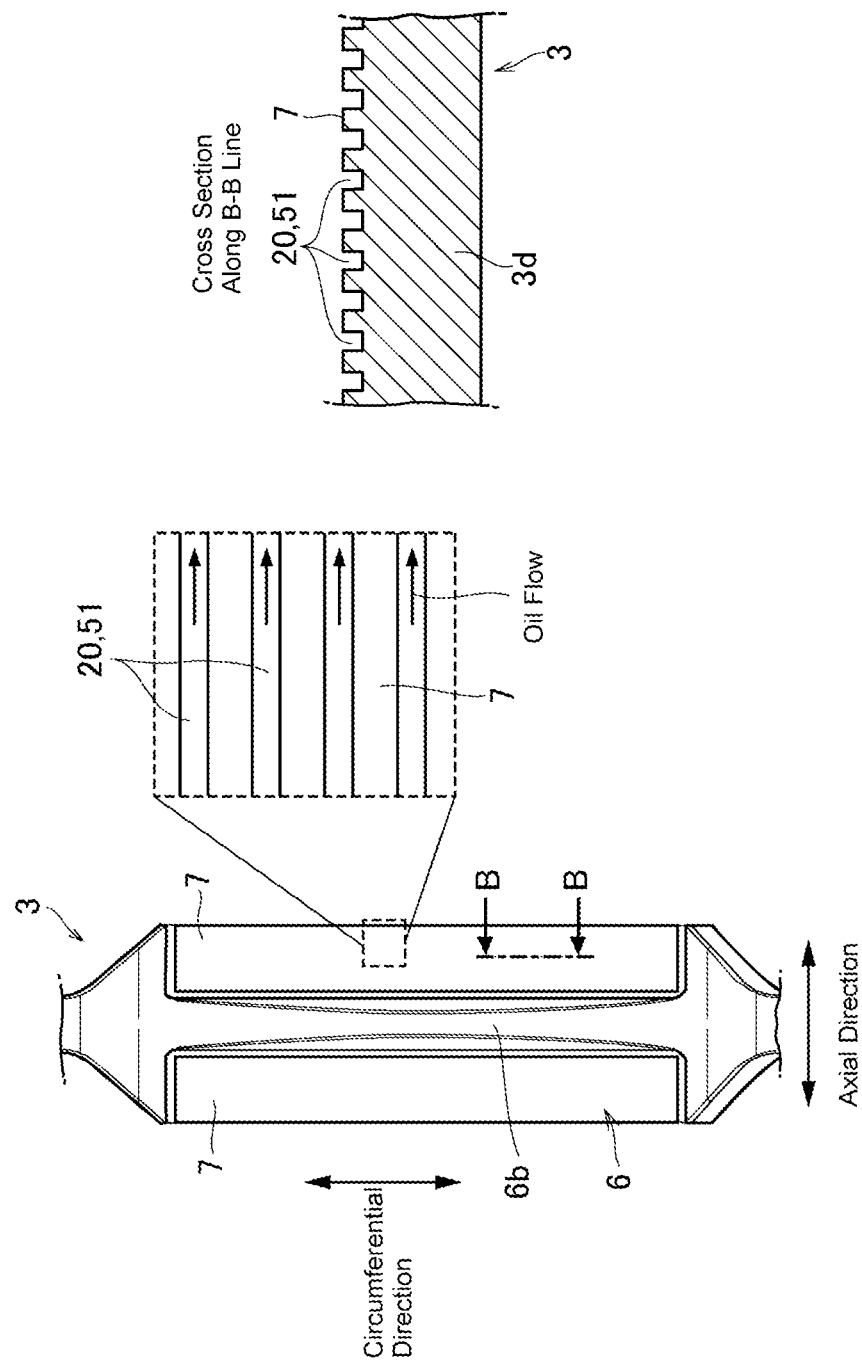
FIG. 10 is a cross-sectional view showing grooves extending on the raceway surface extending in the axial direction.

According to the example shown in FIG. 10, in order to drain the oil 11 from the recess 6 of the inertia body 3 to the outside of the raceway surface 7, at least one groove 51 is/are also formed on the raceway surface 7 to serve as the oil passage 20. Each of the grooves 51 as a chase extends on the raceway surface 7 in the axial direction. According to the example shown in FIG. 10, specifically, a plurality of the grooves 51 are formed not only on the raceway surface 7 to which the first mass 4a of the rolling mass 4 is contacted, but also on the raceway surface 7 to which the second mass 4b of the rolling mass 4 is contacted.

In the example shown in FIG. 10, the each of the grooves 51 individually serves as a clearance to which the oil 11 remaining between the rolling mass 4 and the recess 6 of the inertia body 3 enters. According to the example shown in FIG. 10, therefore, the oil 11 remaining between the rolling mass 4 and the recess 6 of the inertia body 3 is guided to be discharged from the raceway surface 7. Especially, since the grooves 51 extend in the axial direction, the oil 11 is allowed to flow out of the raceway surface 7 certainly. For this reason, each of the rolling masses 4 is allowed to serve as a pendulum mass properly to ensure the vibration damping performance of the damper 1. In addition, an amount of the oil 11 discharged from the raceway surface 7 through the grooves 51 may be adjusted by altering number of grooves 51, and a width and depth of each of the grooves 51. According to the example shown in FIG. 10, therefore, the rolling masses 4 are allowed to oscillate smoothly on the raceway surfaces 7, while being lubricated by the oil 11. Further, the grooves 51 may also be formed easily by e.g., an end mill. According to the example shown in FIG. 1.0, therefore, abrasion of the rolling masses 4, the retainers 5, the raceway surfaces 7 and so on may be prevented by a simple structure.

Figure 11:
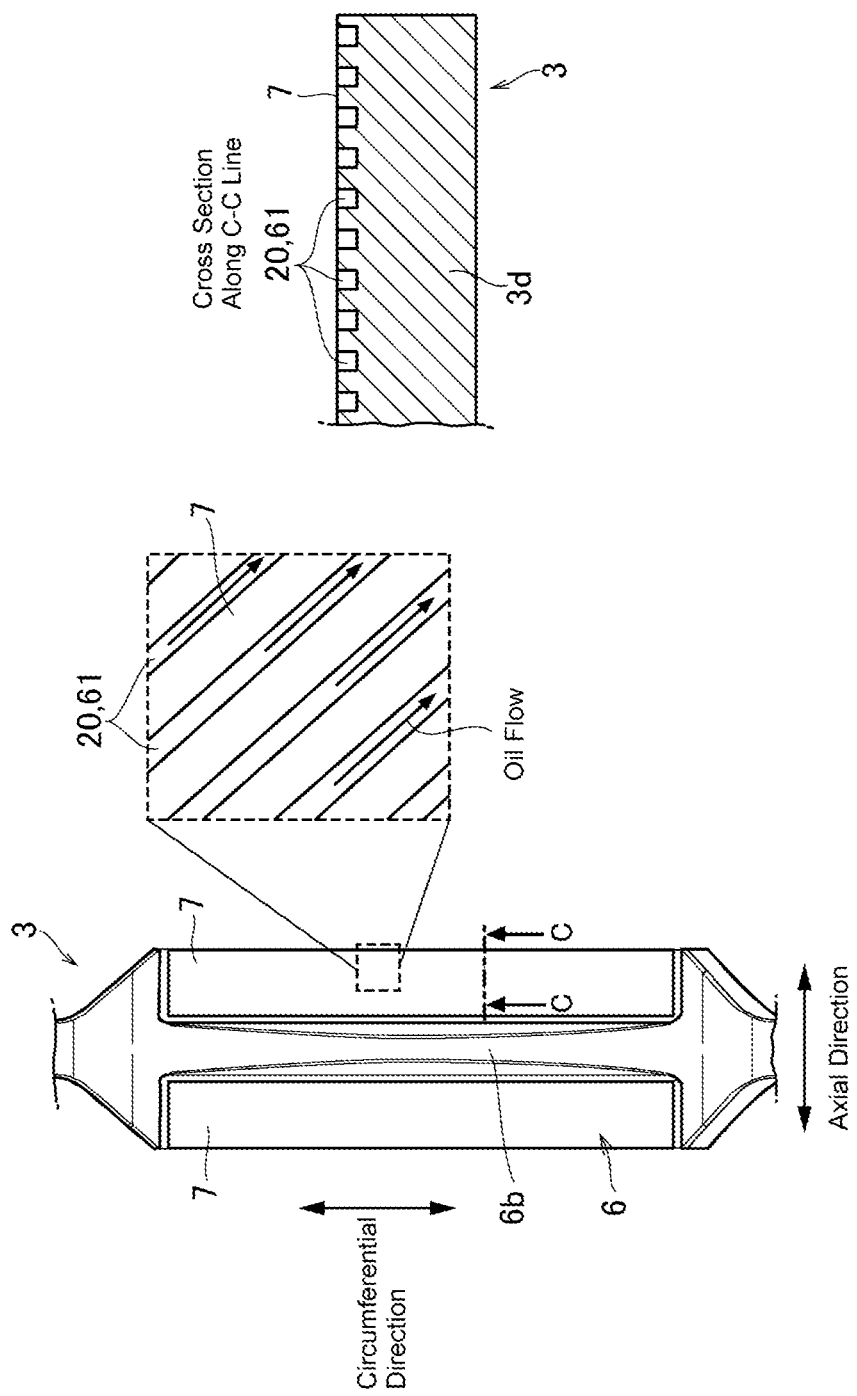
FIG. 11 is a cross-sectional view showing grooves extending on the raceway surface extending obliquely.

According to the example shown in FIG. 11, in order to drain the oil 11 from the recess 6 of the inertia body 3 to the outside of the raceway surface 7, at least one groove 61 is/are also formed on the raceway surface 7 to serve as the oil passage 20. Each of the grooves 61 as a chase extends on the raceway surface 7 obliquely with respect to the axial direction and the circumferential direction from end to end. According to the example shown in FIG. 11, specifically, a plurality of the grooves 61 are formed not only on the raceway surface 7 to which the first mass 4a of the rolling mass 4 is contacted, but also on the raceway surface 7 to which the second mass 4b of the rolling mass 4 is contacted.

In the example shown in FIG. 11, the each of the grooves 61 individually serves as a clearance to which the oil 11 remaining between the rolling mass 4 and the recess 6 of the inertia body 3 enters. According to the example shown in FIG. 11, therefore, the oil 11 remaining between the rolling mass 4 and the recess 6 of the inertia body 3 is guided to be discharged from the raceway surface 7. Especially, since the grooves 61 extend in obliquely, the oil 11 is allowed to flow out of the raceway surface 7 smoothly and certainly. For this reason, each of the rolling masses 4 is allowed to serve as a pendulum mass properly to ensure the vibration damping performance of the damper 1. In addition, an amount of the oil 11 discharged from the raceway surface 7 through the grooves 61 may be adjusted by altering number of grooves 61, and a width and depth of each of the grooves 61. According to the example shown in FIG. 11, therefore, the rolling masses 4 are allowed to oscillate smoothly on the raceway surfaces 7, while being lubricated by the oil 11. Further, the grooves 61 may also be formed easily by e.g., an end mill. According to the example shown in FIG. 11, therefore, abrasion of the rolling masses 4, the retainers 5, the raceway surfaces 7 and so on may be prevented by a simple structure.

Figure 12:
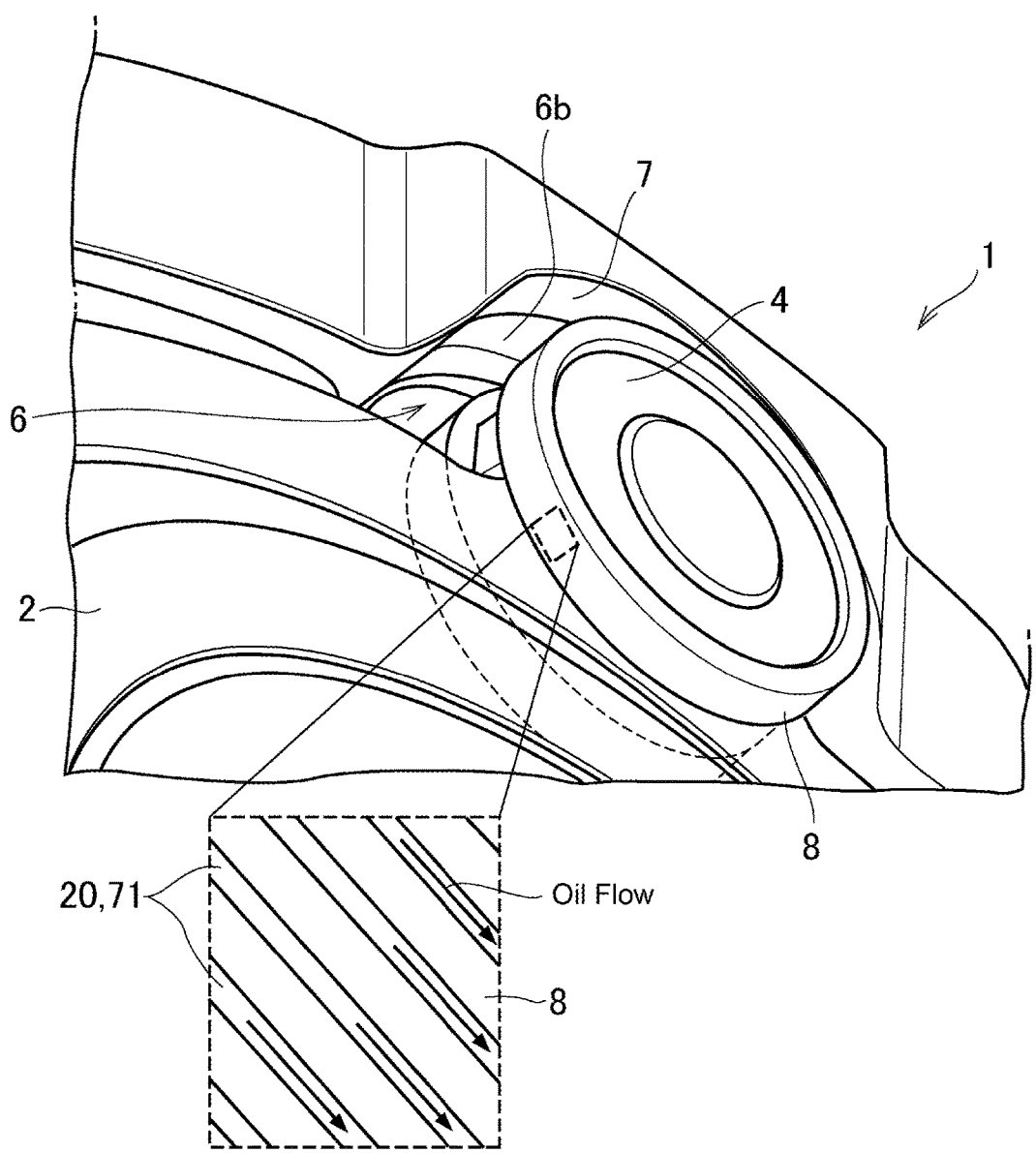
FIG. 12 is a partial enlarged view showing grooves extending on the rolling mass obliquely.

According to the example shown in FIG. 12, in order to drain the oil 11 from the recess 6 of the inertia body 3 to the outside of the raceway surface 7, at least one groove 71 is/are formed on the contact surface 8 of the rolling mass 4 to serve as the oil passage 20. Each of the grooves 71 as a chase extends on the contact surface 8 of the rolling mass 4 obliquely with respect to the axial direction and the circumferential direction from end to end. According to the example shown in FIG. 12, specifically, a plurality of the grooves 71 are formed not only on the contact surface 8 of the first mass 4a of the rolling mass 4, but also on the second mass 4b of the rolling mass 4. Nonetheless, the grooves 71 may also be formed on the contact surface 8 of the rolling mass 4 to extend in the axial direction or the circumferential direction.

In the example shown in FIG. 12, the each of the grooves 71 individually serves as a clearance to which the oil 11 remaining between the rolling mass 4 and the recess 6 of the inertia body 3 enters. According to the example shown in FIG. 12, therefore, the oil 11 remaining between the rolling mass 4 and the recess 6 of the inertia body 3 is guided to flow out of the raceway surface 7. Especially, since the grooves 61 extend in obliquely, the oil 11 is allowed to flow out of the raceway surface 7 smoothly and certainly. For this reason, each of the rolling masses 4 is allowed to serve as a pendulum mass properly to ensure the vibration damping performance of the damper 1. In addition, an amount of the oil 11 discharged from the raceway surface 7 through the grooves 71 may be adjusted by altering number of grooves 71, and a width and depth of each of the grooves 71. According to the example shown in FIG. 12, therefore, the rolling masses 4 are allowed to oscillate smoothly on the raceway surfaces 7, while being lubricated by the oil 11. Further, the grooves 71 may also be formed easily by e.g., an end mill. According to the example shown in FIG. 12, therefore, abrasion of the rolling masses 4, the retainers 5, the raceway surfaces 7 and so on may be prevented by a simple structure.

In the damper 1, one of the grooves 41, 51, 61 shown in FIGS. 9 to 11 may be formed on the raceway surface 7 of the inertia body 3, and the grooves 71 may be formed on the contact surface 8 of the rolling mass 4. That is, the oil passage 20 may be formed on both of the raceway surface 7 and the rolling masses 4. In this case, the oil 11 remaining between the rolling mass 4 and the recess 6 of the inertia body 3 may be discharged from the raceway surface 7 more certainly.

Instead, it is also possible to form the oil passage 20 only on the contact surface 8 of the rolling mass 4 without forming the oil passage 20 on the raceway surface 7. In this case, the above-mentioned stress concentration in the raceway surface 7 can be avoided. In this case, therefore, strength of the raceway surface 7 can be ensured to improve durability of the damper 1.

Figure 13A:
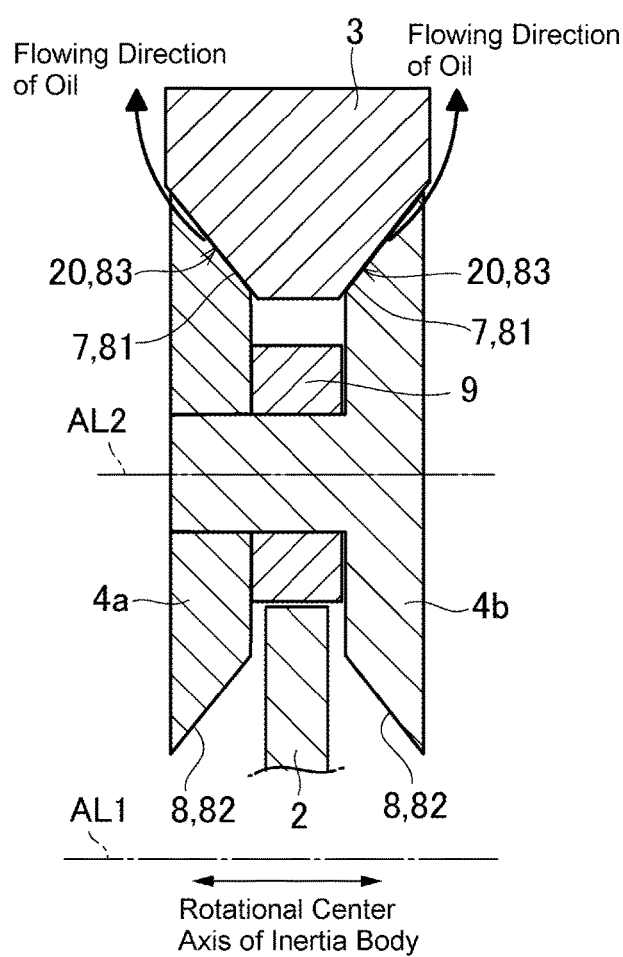
FIGS. 13A and 13B are cross-sectional views showing a clearance between a slant raceway surface and a slant contact surface of the rolling mass.
Figure 13B:
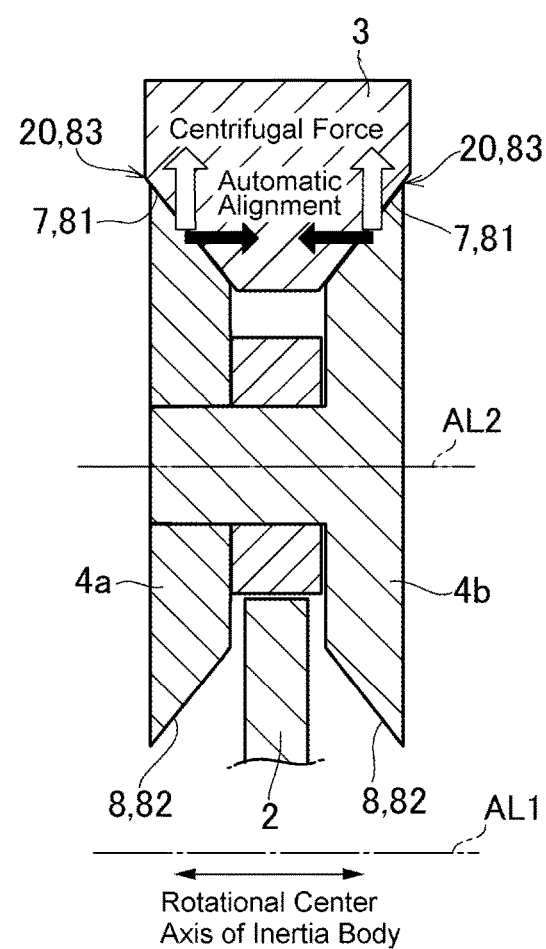

According to the example shown in FIGS. 13A and 13B, the inertia body 3 is provided with a slant raceway surface 81, and the rolling mass 4 is provided with a slant contact surface 82. In the damper 1 according to the example shown in FIGS. 13A and 13B, a clearance 83 between the slant raceway surface 81 of the inertia body 3 and the slant contact surface 82 the rolling mass 4 serves as the oil passage 20.

As illustrated in FIGS. 13A and 13B, the slant raceway surface 81 is formed not only on the inner circumferential surfaces 6a of the recess 6 to which the first mass 4a of the rolling mass 4 is contacted, but also on the inner circumferential surfaces 6a of the recess 6 to which the second mass 4b of the rolling mass 4 is contacted. Specifically, the slant raceway surfaces 81 are formed in such a manner that a thickness of the inertia body 3 within the recess 6 is reduced gradually toward a rotational center axis AL1 of the inertia body 3. In other words, each of the slant raceway surfaces 81 is inclined axially inwardly toward the rotational center axis AL1.

Likewise, the slant contact surface 82 is formed not only on the outer circumferential surface 4f of the first mass 4a of the rolling mass 4, but also on the outer circumferential surface 4f of the second mass 4b of the rolling mass 4. An inclination of each of the slant contact surfaces 82 individually conforms to an inclination of the slant raceway surface 81 opposed thereto. Specifically, the slant contact surfaces 82 are formed in such a manner that a clearance between the slant contact surfaces 82 is reduced gradually toward a rotational center axis AL2 of the rolling mass 4. In other words, each of the slant contact surfaces 82 is inclined axially inwardly toward the rotational center axis AL2.

The slant raceway surfaces 81 of the inertia body 3 and the slant contact surfaces 82 of the rolling mass 4 are slightly isolated away from each other, and each clearance 83 between the slant raceway surface 81 and the slant contact surface 82 serves as the oil passage 20 to discharge the oil 11 remaining in the recess 6 out of the slant raceway surface 81.

According to the example shown in FIGS. 13A and 13B, since the clearance 83 are individually inclined axially outwardly, the oil 11 remaining in the recess 6 of the inertia body 3 can be discharged from the recess 6 more smoothly by the centrifugal force as illustrated in FIG. 13A. According to the example shown in FIGS. 13A and 13B, therefore, each of the rolling masses 4 is allowed to serve as a pendulum mass properly to ensure the vibration damping performance of the damper. In addition, an amount of the oil 11 discharged from the recess 6 through the clearance 83 may be adjusted by altering inclinations and dimensions of the slant raceway surface 81 and the slant contact surface 82. According to the example shown in FIG. 13, therefore, the rolling masses 4 are allowed to oscillate smoothly on the slant raceway surface 81, while being lubricated by the oil 11.

Further, as shown in FIG. 13B, the rolling mass 4 having the slant contact surfaces 82 can be aligned automatically with the inertia body 3 having the slant raceway surfaces 81 by the centrifugal force. According to the example shown in FIGS. 13A and 13B, therefore, the above-mentioned the aligning rib 6b formed in the recess 6 of the inertia body 3 may be omitted. That is, the structure of the damper 1 can be simplified. In addition, since each of the rolling masses 4 is automatically aligned with the inertia body 3, the rolling masses 4 are allowed to oscillate more effectively to further improve the vibration damping performance of the damper 1.

Although the above exemplary embodiments of the present application have been described, it will be understood by those skilled in the art that the present application should not be limited to the described exemplary embodiments, and various changes and modifications can be made within the scope of the present application. For example, the foregoing through hole 21, axial through hole 31 and the radial through hole 32, grooves 41, 51 and 61 may also be formed on the slant raceway surface 81 of the inertia body 3. That is, the oil passage 20 may also be formed on the slant raceway surface 81 of the inertia body 3. In this case, the oil 11 remaining in the recess 6 of the inertia body 3 may be discharged from the recess 6 more smoothly.

The foregoing through hole 21, axial through hole 31 and the radial through hole 32, grooves 41, 51 and 61 may also be formed on both of the slant raceway surface 81 of the inertia body 3 and the slant contact surfaces 82 of the rolling mass 4. That is, the oil passage 20 may also be formed on both of the slant raceway surface 81 of the inertia body 3 and the slant contact surfaces 82 of the rolling mass 4. In this case, the oil 11 remaining in the recess 6 of the inertia body 3 may also be discharged from the recess 6 more smoothly.

Instead, the oil passage 20 may be formed only on the slant contact surfaces 82 of the rolling mass 4. In this case, neither an opening nor hole is formed on the slant raceway surface 81 of the inertia body 3. In this case, therefore, the stress concentration in the slant raceway surface 81 can be prevented to improve durability of the damper 1.

What is claimed is:

1. A centrifugal pendulum damper comprising:
   a rotary member that is rotated by torque transmitted thereto;
   an inertia body that is arranged coaxially with the rotary member while being allowed to oscillate relatively to the rotary member;
   a rolling mass that connects the rotary member to the inertia body in a torque transmittable manner;
   a retainer that is formed on an outer circumference of the rotary member to hold the rolling mass such that the rolling mass is restricted to oscillate in a circumferential direction but allowed to reciprocate in a radial direction to be contacted to the inertia body;
   a recess as an arcuate depression that is formed on an inner circumference of the inertia body to hold the rolling mass, and whose curvature radius is longer than a radius of the rolling mass; and
   a raceway surface formed on an inner circumference of the recess to which an outer circumferential surface of the rolling mass is contacted,
   wherein torque of the rotary member is transmitted to the inertia body through the rolling mass to damp torsional vibrations of the rotary member,
   the centrifugal pendulum damper further comprising:
   an oil that lubricates the rolling mass, the retainer, and the raceway surface; and
   an oil passage that guides the oil remaining in the recess while being subjected to a centrifugal force to flow out of the raceway surface.

2. The centrifugal pendulum damper as claimed in claim 1, wherein the oil passage includes a groove that is formed on at least one of the raceway surface of the inertia body and the outer circumferential surface of the rolling mass so as to allow the oil remaining in the recess of the inertia body to flow out of the raceway surface.

3. The centrifugal pendulum damper as claimed in claim 2,
   wherein the raceway surface includes a slant raceway surface that is inclined axially inwardly toward a rotational center axis of the inertia body,
   the outer circumferential surface of the rolling mass includes a slant contact surface that is inclined axially inwardly toward a rotational center axis of the rolling mass, and
   an inclination of the slant contact surface conforms to an inclination of the slant raceway surface.

4. The centrifugal pendulum damper as claimed in claim 2, wherein the groove is formed on the at least one of the raceway surface of the inertia body and the outer circumferential surface of the rolling mass in the circumferential direction.

5. The centrifugal pendulum damper as claimed in claim 4,
   wherein the raceway surface includes a slant raceway surface that is inclined axially inwardly toward a rotational center axis of the inertia body,
   the outer circumferential surface of the rolling mass includes a slant contact surface that is inclined axially inwardly toward a rotational center axis of the rolling mass, and
   an inclination of the slant contact surface conforms to an inclination of the slant raceway surface.

6. The centrifugal pendulum damper as claimed in claim 2, wherein the groove is formed on the at least one of the raceway surface of the inertia body and the outer circumferential surface of the rolling mass in an axial direction.

7. The centrifugal pendulum damper as claimed in claim 6,
   wherein the raceway surface includes a slant raceway surface that is inclined axially inwardly toward a rotational center axis of the inertia body,
   the outer circumferential surface of the rolling mass includes a slant contact surface that is inclined axially inwardly toward a rotational center axis of the rolling mass, and
   an inclination of the slant contact surface conforms to an inclination of the slant raceway surface.

8. The centrifugal pendulum damper as claimed in claim 2, wherein the groove is formed on the at least one of the raceway surface of the inertia body and the outer circumferential surface of the rolling mass obliquely with respect to an axial direction and the circumferential direction of the inertia body or the rolling mass.

9. The centrifugal pendulum damper as claimed in claim 8,
   wherein the raceway surface includes a slant raceway surface that is inclined axially inwardly toward a rotational center axis of the inertia body,
   the outer circumferential surface of the rolling mass includes a slant contact surface that is inclined axially inwardly toward a rotational center axis of the rolling mass, and
   an inclination of the slant contact surface conforms to an inclination of the slant raceway surface.

10. The centrifugal pendulum damper as claimed in claim 1, wherein the oil passage is formed on the inertia body from the raceway surface toward the outer circumferential surface of the inertia body in the radial direction so as to allow the oil remaining in the recess to flow out of the raceway surface.

11. The centrifugal pendulum damper as claimed in claim 10,
    wherein the raceway surface includes a slant raceway surface that is inclined axially inwardly toward a rotational center axis of the inertia body,
    the outer circumferential surface of the rolling mass includes a slant contact surface that is inclined axially inwardly toward a rotational center axis of the rolling mass, and
    an inclination of the slant contact surface conforms to an inclination of the slant raceway surface.

12. The centrifugal pendulum damper as claimed in claim 10, wherein the oil passage includes:
    an axial through hole that is formed on the inner circumference of the recess of the inertia body at a predetermined portion other than the raceway surface to open toward the raceway surface; and
    a radial through hole that penetrates through the inertia body between the axial through hole and the outer circumferential surface of the inertia mass in the radial direction so as to allow the oil remaining in the recess of the inertia body to flow out of the raceway surface.

13. The centrifugal pendulum damper as claimed in claim 12,
    wherein the raceway surface includes a slant raceway surface that is inclined axially inwardly toward a rotational center axis of the inertia body,
    the outer circumferential surface of the rolling mass includes a slant contact surface that is inclined axially inwardly toward a rotational center axis of the rolling mass, and an inclination of the slant contact surface conforms to an inclination of the slant raceway surface.

14. The centrifugal pendulum damper as claimed in claim 10, wherein the oil passage includes a through hole that penetrates through the inertia body between the raceway surface and the outer circumferential surface of the inertia body in the radial direction so as to allow the oil remaining in the recess of the inertia body to flow out of the raceway surface.

15. The centrifugal pendulum damper as claimed in claim 14,
wherein the raceway surface includes a slant raceway surface that is inclined axially inwardly toward a rotational center axis of the inertia body,
the outer circumferential surface of the rolling mass includes a slant contact surface that is inclined axially inwardly toward a rotational center axis of the rolling mass, and
an inclination of the slant contact surface conforms to an inclination of the slant raceway surface.

16. The centrifugal pendulum damper as claimed in claim 1,
wherein the raceway surface includes a slant raceway surface that is inclined axially inwardly toward a rotational center axis of the inertia body,
the outer circumferential surface of the rolling mass includes a slant contact surface that is inclined axially inwardly toward a rotational center axis of the rolling mass, and
an inclination of the slant contact surface conforms to an inclination of the slant raceway surface.

17. The centrifugal pendulum damper as claimed in claim 1,
wherein the raceway surface includes a slant raceway surface that is inclined axially inwardly toward a rotational center axis of the inertia body,
the outer circumferential surface of the rolling mass includes a slant contact surface that is inclined axially inwardly toward a rotational center axis of the rolling mass,
an inclination of the slant contact surface conforms to an inclination of the slant raceway surface, and
the oil passage includes a clearance between the slant raceway surface and the slant contact surface that allows the oil remaining in the recess of the inertia body to flow out of the slant raceway surface.

* * * * *